United States Patent [19]
Dhingra et al.

[11] Patent Number: 6,054,052
[45] Date of Patent: Apr. 25, 2000

[54] SELECTIVE SORPTION OF ORGANICS BY METAL-CONTAINING M41S

[75] Inventors: Sandeep S. Dhingra, Plainsboro, N.J.; Charles T. Kresge, West Chester; Sharon B. McCullen, Newtown, both of Pa.

[73] Assignee: Mobil Oil Corporation, Fairfax, Va.

[21] Appl. No.: 08/572,823

[22] Filed: Dec. 14, 1995

[51] Int. Cl.[7] .............................. B01D 15/08; C02F 1/28
[52] U.S. Cl. ...................... 210/656; 210/679; 210/691
[58] Field of Search .................................. 210/679, 690, 210/691, 656

[56] References Cited

U.S. PATENT DOCUMENTS

| | | | |
|---|---|---|---|
| 4,079,001 | 3/1978 | Haase et al. | 210/679 |
| 5,098,684 | 3/1992 | Kresge et al. | 423/277 |
| 5,102,643 | 4/1992 | Kresge et al. | 423/328 |
| 5,145,816 | 9/1992 | Beck et al. | 502/60 |
| 5,198,203 | 3/1993 | Kresge et al. | 423/718 |
| 5,211,934 | 5/1993 | Kresge et al. | 502/60 |
| 5,215,737 | 6/1993 | Chu et al. | 502/60 |
| 5,220,101 | 6/1993 | Beck et al. | 585/824 |
| 5,364,797 | 11/1994 | Olson et al. | 436/501 |
| 5,378,440 | 1/1995 | Herbst et al. | 423/210 |

OTHER PUBLICATIONS

Jack T. Spadaro, "Hydroxyl Radical Mediated Degradation of Azo Dyes: Evidence for Benzene Generation", 1994 American Chemical Society, vol. 28, No. 7., pp. 1389–1393.

Jang–Yeun Horng and Shang–Da Huang, "Removal of Organic Dye (Direct Blue) from Synthetic Wastewater by Adsorptive Bubble Separation Techniques", 1993 American Chemical Society, vol. 27, No. 6., pp. 1169–1176.

Heinrich Zollinger, Syntheses, Properties and Applications of Organic Dyes and Pigments, VCH: Color Chemistry, New York, 1987, p. 92.

*Primary Examiner*—Ivars Cintins
*Attorney, Agent, or Firm*—Peter W. Roberts; Malcolm D. Keen

[57] ABSTRACT

Incorporation of zirconium, nickel and/or copper into M41S results in selective sorption of bulky organic molecules. Zirconium, nickel and/or copper may be incorporated into M41S by exchange or impregnation.

6 Claims, No Drawings

SELECTIVE SORPTION OF ORGANICS BY METAL-CONTAINING M41S

BACKGROUND OF THE INVENTION

This invention relates to separation methods which employ solid inorganic porous materials. More particularly, the present invention relates to novel synthetic ultra-large pore crystalline material useful for separating component substances within a mixture as well as methods relating thereto.

Porous inorganic solids have great utility as catalysts and separation media for industrial applications. Catalytic and sorptive activity are enhanced by the extensive surface area provided by a readily accessible microstructure characteristic of these solids.

The porous materials in use today can be sorted into three broad categories using the details of their microstructure as a basis for classification. These categories are 1) amorphous and paracrystalline supports, 2) crystalline molecular sieves and 3) modified layered materials.

Variations in the microstructures of these materials manifest themselves as important differences in the catalytic and sorptive behavior of the materials, as well as differences in various observable properties used to characterize them. For example, surface area, pore size and variability in pore sizes, the presence or absence of X-ray diffraction patterns, as well as the details in such patterns, and the appearance of the materials when their microstructure is studied by transmission electron microscopy and electron diffraction methods can be used to characterize porous inorganic solids.

Amorphous and paracrystalline materials represent an important class of porous inorganic solids which have been used for many years in industrial applications. Typical examples of these materials are the amorphous silicas commonly used in catalyst formulations and the paracrystalline transitional aluminas used as solid acid catalysts and petroleum reforming catalyst supports.

The amorphous materials are generally characterized as "amorphous" since they are substances having no long range order. Unfortunately, this can be somewhat misleading since almost all materials are ordered to some degree, at least on the local scale. An alternate term which has been used to describe these materials is "X-ray indifferent". The microstructure of the silicas consists of 100–250 Å particles of dense amorphous silica (*Kirk-Othmer Encyclopedia of Chemical Technology*, 3rd Edition, Vol. 20, John Wiley & Sons, New York, p. 766–781, 1982), with the porosity resulting from voids between the particles. Since there is no long range order in these materials, the pore sizes tend to be distributed over a rather large range. This lack of order also manifests itself in the X-ray diffraction pattern, which is usually featureless.

Paracrystalline materials such as the transitional aluminas also have a wide distribution of pore sizes, but exhibit better defined X-ray diffraction patterns usually consisting of a few broad peaks. The microstructure of these materials consists of tiny crystalline regions of condensed alumina phases and the porosity of the materials results from irregular voids between these regions (K. Wefers and Chanakya Misra, "Oxides and Hydroxides of Aluminum", Technical Paper No. 19 Revised, Alcoa Research Laboratories, p. 54–59, 1987).

Despite any differences arising between these paracrystalline or amorphous materials, neither substance has long range order controlling the sizes of pores in the material. Consequently, variability in pore size is typically quite high. The sizes of pores in these materials fall into what is known in the art as the "mesoporous range", which, for the purposes of this Application, is from about 13 to 200 Å.

In sharp contrast to these structurally ill-defined solids are materials whose pore size distribution is narrow because it is controlled by the precisely repeating crystalline nature of the materials' microstructure. These materials are referred to as "molecular sieves", the most important examples of which are zeolites.

Zeolites, both natural and synthetic, have been demonstrated in the past to have catalytic properties for various types of hydrocarbon conversion. Certain zeolitic materials are ordered, porous crystalline aluminosilicates having a definite crystalline structure as determined by X-ray diffraction. These crystalline structures contain a large number of smaller cavities which may be interconnected by a number of still smaller channels or pores. These cavities and pores are uniform in size within a specific zeolitic material. Since the dimensions of these pores provide access to molecules of certain dimensions while rejecting those of larger dimensions, these materials are known as "molecular sieves". These molecular sieves have been utilized in a variety of ways in order to take advantage of their properties.

Molecular sieves, both natural and synthetic, include a wide variety of positive ion-containing crystalline silicates. These silicates can be described as a rigid three-dimensional framework of $SiO_4$ and Group IIIB element oxides, e.g. $AlO_4$, in which the tetrahedra are cross-linked by the sharing of oxygen atoms. The ratio of the total Group IIIB element, e.g. aluminum, and Group IVB element, e.g. silicon, atoms to oxygen atoms is 1:2. The electrovalence of the tetrahedra containing the Group IIIB element, e.g. aluminum, is balanced by the inclusion of a cation in the crystal. Examples of such cations include alkali metal or alkaline earth metal cations. This can be expressed wherein the ratio of the Group IIIB element, e.g. aluminum, to the number of various cations, such as Ca/2, Sr/2, Na, K or Li, is equal to unity. One type of cation may be exchanged either entirely or partially with another type of cation utilizing ion exchange techniques in a conventional manner. By means of such cation exchange, it has been possible to vary the properties of a given silicate by suitable selection of the cation. The spaces between the tetrahedra are occupied by molecules of water prior to dehydration.

Prior art techniques have resulted in the formation of a great variety of synthetic zeolites. Many of these zeolites have come to be designated by letter or other convenient symbols, as illustrated by zeolite A (U.S. Pat. No. 2,882,243); zeolite X (U.S. Pat. No. 2,882,244); zeolite Y (U.S. Pat. No. 3,130,007); zeolite ZK-5 (U.S. Pat. No. 3,247,195); zeolite ZK-4 (U.S. Pat. No. 3,314,752); zeolite ZSM-5 (U.S. Pat. No. 3,702,886); zeolite ZSM-11 (U.S. Pat. No. 3,709,979); zeolite ZSM-12 (U.S. Pat. No. 3,832,449); zeolite ZSM-20 (U.S. Pat. No. 3,972,983); ZSM-35 (U.S. Pat. No. 4,016,245); and zeolite ZSM-23 (U.S. Pat. No. 4,076,842), merely to name a few.

The $SiO_2/Al_2O_3$ ratio of a given zeolite is often variable. For example, zeolite X can be synthesized with $SiO_2/Al_2O_3$ ratios of from 2 to 3; zeolite Y, with ratios from 3 to about 6. In some zeolites, the upper limit of the $SiO_2/Al_2O_3$ ratio is unbounded. ZSM-5 is one such example wherein the $SiO_2/Al_2O_3$ ratio is at least 5 and up, as measured within the limits of present analytical measurement techniques. U.S. Pat. No. 3,941,871 (Re. 29,948) discloses a porous crystalline silicate made from a reaction mixture containing no deliberately added alumina in the recipe and exhibiting the X-ray diffraction pattern characteristic of ZSM-5. U.S. Pat. Nos. 4,061,724; 4,073,865 and 4,104,294 describe crystalline silicates of varying alumina and metal content.

Additionally, aluminum phosphates are taught in the U.S. Pat. Nos. 4,310,440 and 4,385,994, for example. These aluminum phosphate materials have essentially electroneutral lattices. U.S. Pat. No. 3,801,704 teaches an aluminum phosphate treated in a certain way to impart acidity.

An early reference to a hydrated aluminum phosphate which is crystalline until heated at about 110° C., at which point it becomes amorphous or transforms, is the "$H_1$" phase or hydrate of aluminum phosphate of F.d'Yvoire, *Memoir Presented to the Chemical Society*, No. 392, "Study of Aluminum Phosphate and Trivalent Iron", Jul. 6, 1961 (received), pp. 1762–1776. This material, when crystalline, is identified by the JCPDS International Center for Diffraction Data card number 15-274. Once heated at about 110° C., however, the d'Yvoire material becomes amorphous or transforms to the aluminophosphate form of tridymite.

Compositions comprising crystals having a framework topology after heating at 110° C. or higher and exhibiting an X-ray diffraction pattern consistent with a material having pore windows formed by 18 tetrahedral members of about 12–13 Å in diameter are taught in U.S. Pat. No. 4,880,611.

A naturally occurring, highly hydrated basic ferric oxyphosphate mineral, cacoxenite, is reported by Moore and Shen, *Nature*, Vol. 306, No. 5941, pp. 356–358 (1983) to have a framework structure containing very large channels with a calculated free pore diameter of 14.2 Å. R. Szostak et al., *Zeolites: Facts. Figures. Future*, Elsevier Science Publishers B. V., 1989, present work showing cacoxenite as being very hydrophilic, i.e. adsorbing non-polar hydrocarbons, only with great difficulty. Their work also shows that thermal treatment of cacoxenite causes an overall decline in X-ray peak intensity.

Silicoaluminophosphates of various structures are taught in U.S. Pat. No. 4,440,871. Aluminosilicates containing phosphorus, i.e., silicoaluminophosphates of particular structures are taught in U.S. Pat. No. 3,355,246 (i.e. ZK-21) and U.S. Pat. No. 3,791,964 (i.e., ZK-22). Other teachings of silicoaluminophosphates and their synthesis include U.S. Pat. No. 4,673,559 (two-phase synthesis method); U.S. Pat. No. 4,623,527 (MCM-10); U.S. Pat. No. 4,639,358 (MCM-1); U.S. Pat. No. 4,647,442 (MCM-2); U.S. Pat. No. 4,664,897 (MCM-4); U.S. Pat. No. 4,638,357 (MCM-5); and U.S. Pat. No. 4,632,811 (MCM-3).

A method for synthesizing crystalline metalloaluminophosphates is shown in U.S. Pat. No. 4,713,227. An antimonophosphoaluminate and the method for its synthesis are taught in U.S. Pat. No. 4,619,818. U.S. Pat. No. 4,567,029 teaches metalloaluminophosphates, and titaniumaluminophosphate and the method for its synthesis are taught in U.S. Pat. No. 4,500,651.

The phosphorus-substituted zeolites of Canadian Patents 911,416; 911,417; and 911,418 are referred to as "aluminosilicophosphate" zeolites. Some of the phosphorus therein appears to be occluded, not structural.

U.S. Pat. No. 4,363,748 describes a combination of silica and aluminum-calcium-cerium phosphate as a low acid activity catalyst for oxidative dehydrogenation. Great Britain Patent 2,068,253 discloses a combination of silica and aluminum-calcium-tungsten phosphate as a low acid activity catalyst for oxidative dehydrogenation. U.S. Pat. No. 4,228,036 teaches an alumina-aluminum phosphate-silica matrix as an amorphous body to be mixed with zeolite for use as cracking catalyst. U.S. Pat. No. 3,213,035 teaches improving hardness of aluminosilicate catalysts by treatment with phosphoric acid. The catalysts are amorphous.

Other patents teaching aluminum phosphates include U.S. Pat. Nos. 4,365,095; 4,361,705; 4,222,896; 4,210,560; 4,179,358; 4,158,621; 4,071,471; 4,014,945; 3,904,550; and 3,697,550.

The precise crystalline microstructure of most zeolites manifests itself in a well-defined X-ray diffraction pattern that usually contains many sharp maxima and that serves to uniquely define the material. Similarly, the dimensions of pores in these materials are very regular, due to the precise repetition of the crystalline microstructure. All molecular sieves discovered to date have pore sizes in the microporous range, which is usually quoted as 2 to 20 Å, with the largest reported being about 12 Å.

Certain layered materials, which contain layers capable of being spaced apart with a swelling agent, may be pillared to provide materials having a large degree of porosity. Examples of such layered materials include clays. Such clays may be swollen with water, whereby the layers of the clay are spaced apart by water molecules. Other layered materials are not swellable with water, but may be swollen with certain organic swelling agents such as amines and quaternary ammonium compounds. Examples of such non-water swellable layered materials are described in U.S. Pat. No. 4,859,648 and include layered silicates, magadiite, kenyaite, trititanates and perovskites. Another example of a non-water swellable layered material, which can be swollen with certain organic swelling agents, is a vacancy-containing titanometallate material, as described in U.S. Pat. No. 4,831,006.

Once a layered material is swollen, the material may be pillared by interposing a thermally stable substance, such as silica, between the spaced apart layers. The aforementioned U.S. Pat. Nos. 4,831,006 and 4,859,648 describe methods for pillaring the non-water swellable layered materials described therein and are incorporated herein by reference for definition of pillaring and pillared materials.

Other patents teaching pillaring of layered materials and the pillared products include U.S. Pat. Nos. 4,216,188; 4,248,739; 4,176,090; and 4,367,163; and European Patent Application 205,711.

The X-ray diffraction patterns of pillared layered materials can vary considerably, depending on the degree that swelling and pillaring disrupt the otherwise usually well-ordered layered microstructure. The regularity of the microstructure in some pillared layered materials is so badly disrupted that only one peak in the low angle region on the X-ray diffraction pattern is observed, at a d-spacing corresponding to the interlayer repeat in the pillared material. Less disrupted materials may show several peaks in this region that are generally orders of this fundamental repeat. X-ray reflections from the crystalline structure of the layers are also sometimes observed. The pore size distribution in these pillared layered materials is narrower than those in amorphous and paracrystalline materials but broader than that in crystalline framework materials.

Indeed, X-ray diffraction patterns have come to play an important role in identification of various crystalline materials, especially pillared layered materials. Nevertheless, it is the physical properties of these materials which render them valuable assets to the scientific and industrial communities. These materials are not only valuable when employed in the petroleum industry, but they have also been found to exhibit properties useful for a variety of applications including such fields as nonlinear optics and the biological and chemical sciences.

One particular area of interest involves employing these porous crystalline materials in the fields of chemistry and biology in order to effect the separation of substances contained within a mixture. Generally, separations encompass a vast number of apparatus and techniques; however, they can be broadly classified into several categories, namely: extractions, distillations, centrifugations, precipitations, filtrations, clarifications, membrane separations and chromatography.

Despite the vast range in apparatus and techniques, all separations involve the need for two phases of matter. For example, extractions generally involve two immiscible liquid phases, typically an aqueous and an organic phase, wherein a solute migrates out of one phase and into the other based upon its relative solubility between the two phases. In contrast, chromatography generally involves a fluid mobile phase which is contacted with a fixed stationary phase.

In chromatography, the mobile phase is typically a gas or a liquid which contains a sample to be separated or purified. The mixture generally contains several components which are to be isolated from one another based upon some physical property of the substances, such as molecular weight, binding polarity or the like. Additionally, all chromatography methods operate to isolate a particular substance based upon a retention of that substance by the stationary phase or, alternatively, by the relative tendencies of different substances to partition into the stationary phase and become associated therein.

There are various types of chromatography, including ion exchange, reverse phase, partition, affinity, elution, column, adsorption, flat-bed, batch, thin layer, paper, gel permeation and other size exclusion-based chromatography as well as gas, liquid and solid chromatography. Generally, the nomenclature for the different types of chromatography is based upon either the type of mobile phase employed, the nature of the stationary phase, the nature of the interaction between the stationary phase and the substance retained by it or the type of technique or apparatus used in the chromatographic system. For example, gas and liquid chromatography are named for the type of mobile phase employed. Ion exchange, affinity, partition, adsorption and size exclusion chromatography are named due to the nature of the interaction between the stationary phase and the substance retained by it. Elution, reverse phase, column, flat-bed, batch, thin layer and paper chromatography are named based upon the type of technique or apparatus employed.

As previously mentioned, some other separations include filtration, clarification and membrane separations, all of which are important in the fields of chemistry and biology. Membrane separations are processes for the separation of mixtures using thin barriers or membranes positioned between two miscible fluids. Typically, concentration or pressure differentials provide a suitable driving force across the membrane for promoting separation of one or more components in the mixture.

Generally, membrane separations may be sub-divided into the categories of ultrafiltration, dialysis, electrodialysis, reverse osmosis, gas or liquid diffusions and facilitated transport mechanisms driven by chemical reactions. Filtration involves the separation of solid particles from a fluid-solid suspension in which they are contained. The separation is generally performed by a filter medium having a predetermined pore size. Clarification involves the removal of extremely fine, particulate solids from liquids.

Although clarification can be thought of as an ultra-fine filtration in the sense that solid particulates are removed from a liquid, the technique is different from filtration in that clarification employs a different set of separation mechanics including gravity sedimentation, centrifugal sedimentation, magnetic separation and similar mechanical separation techniques which usually do not involve a filter. Other major separation techniques include distillation, extraction and precipitations.

Regardless of the type of separation or the specific parameters associated with it, all separations can be grouped into two categories, those which employ solids either as a separation means or as a support mechanism for the separation means and those which employ no such solids. For example, extractions usually do not employ solids for the separation but rather rely upon the relative solubility of a particular solute in two immiscible liquid phases. In contrast, most chromatography-based separations employ a solid in some form, either as a support mechanism or a separation means or both. Alternatively, distillations and precipitations may employ solids but these are typically utilized either as inert condensation supports or crystal seeding mechanisms, respectively.

In liquid-liquid chromatography, for example, one liquid functions as the mobile phase while the other operates as the stationary phase. The liquid stationary phase is typically supported by affixing it to a solid substrate, either by physisorption or chemisorption. The separation occurs via the relative tendency of certain components present in the liquid mobile phase to partition into the liquid stationary phase based upon some physical characteristic, such as polarity or solubility. This form of chromatography is also commonly referred to as partition-based chromatography since it is based upon the tendency of a sample to partition into one phase more readily than other components in a mixture.

Alternatively, most affinity-based chromatography techniques employ a stationary phase which involves a solid separating agent supported by an inert solid support means. Typically, an inert solid having a high surface area is coated with a substance, such as a particular protein, which has a specific binding affinity for a substance which is to be isolated. In such a system the solid protein-based separating agent performs the separation.

Other types of chromatography systems employ solids which function as separating agents as well as support mechanisms. For example, certain types of adsorption-based chromatography systems employ porous solid materials to perform a size exclusion-based separation while simultaneously providing a support to which a secondary separating agent is attached. The secondary separating agent is typically some reactive molecule or a functional chemical moiety that performs a separation based upon its interaction with a particular component in a mixture.

Additionally, other separation techniques may employ solids in the manner discussed above. For example, membrane separations often employ solid porous materials which have been deposited or coated onto an inorganic substrate in order to produce a thin layer membrane employed as a separating agent. Similar approaches are used for constructing filters used in filtration and clarification procedures.

In light of the various separations which employ solids, such as those discussed above, there exists an ongoing need to develop new and useful separation techniques as well as the need to provide vehicles for improving the efficiency of existing separation technologies. As previously mentioned, a variety of porous inorganic solids, such as zeolites as well as other related types of molecular sieves, have been applied in wide range of technologies due to their unique physical properties. In particular, these materials have been employed in separation techniques, mostly in the area of industrial gas separations, since the porous nature of their microstructure allows entering molecules access to an extensive surface area. This increased surface area enhances the utility of these materials with respect to their catalytic and sorptive activities.

Unfortunately, many of these materials have some inherent variation in pore size which tends to undermine the integrity of separations in which they are employed, especially when these materials are involved in size exclusion-based separation techniques. Moreover, most currently available molecular sieves have a relatively small pore size. As there is no way of tailoring the pore sizes of such sieves, the artisan is forced to choose between different sieves, depending upon the desired pore size. This is often undesirable since utilizing different sieves may invariably invoke unpredictable results in the procedure in which the sieve is employed.

M41S materials are a new class of molecular sieves. Sorption with M41S is described in U.S. Pat. No. 5,378,440, incorporated herein by reference. Sorption with organometallic functionalized M41S is described in U.S. Pat. Nos. 5,145,816 and 5,220,101, incorporated herein by reference. U.S. Pat. No. 5,364,797 describes a sensor device containing M41S capable of detecting an event such as sorption of a gas.

Waste water treatment to remove organic contaminants is a major concern of many industrial processes. For example, dye manufacturing in the United States, produced 127,000 tons of dyes in 1988, with azo dyes constituting the largest class of organic dyes (Zollinger, "Color Chemistry-Synthesis, Properties and Applications of Organic Dyes and pigments" VCH: New York, 92, 1987). Approximately 10–15% of dye is lost during the dyeing process and released into waste effluent. The disposal of dye containing effluents poses major environmental problems. Very low level of dyes, less than 1 ppm, are visible and sorb sunlight which adversely affects the ecosystems of streams and rivers. Additionally, some azo dyes are toxic and diazo dyes are known carcinogens.

The dyes are typically removed from aqueous waste streams by adsorption, coagulation, bio and chemical photo degradation (Spadaro et al., Environ. Sci. Technol. 28, 1989, 1994 and Horng et al., Environ. sci. Technol 27, 1169, 1993). For the adsorption processes, the sorbents typically are charcoal, silica gel, bauxite, peat, wood or ion-exchange resin.

It has now been found that zirconium-containing M41S, copper-containing M41S and nickel-containing M41S exhibit unique sorption separation of organic contaminants from liquid and gas phase mixtures.

It is therefore an object of the present invention to provide a process for removal of organic molecules using zirconium-containing, nickel-containing and/or copper-containing M41S.

It is a further object of the present invention to provide a process for removing azo dyes from waste streams using zirconium-containing, nickel-containing and/or copper-containing M41S.

SUMMARY OF THE INVENTION

The present invention incorporates a zirconium, nickel and/or copper metal into M41S molecular sieve material by contacting the material with a treatment composition. In particular, the treatment composition comprises zirconium, copper or nickel ions, for example, $Ni^{+2}$, $Zr^{+4}$, and $Cu^{+2}$. The above metals may act as possible anchoring sites for organic molecules or change the hydrophilicity of the M41S surface.

The invention therefore includes a process for separating at least one organic component from a mixture of components in the vapor or liquid phase which comprises contacting the mixture with a sorbent, said sorbent comprising zirconium, nickel and/or copper, and an inorganic, porous, non-layered crystalline phase material, said material exhibiting after calcination, an X-ray diffraction pattern with at least one peak at a d-spacing greater than about 18 Å Units with a relative intensity of 100 and having a benzene adsorption capacity of greater than 15 grams per 100 grams of said material at 50 torr and 25° C.

The invention further includes a process for sorption separation of azo dyes from aqueous solution comprising contacting said aqueous solution with a sorbent, said sorbent comprising zirconium, nickel and/or copper, and an inorganic, porous, non-layered crystalline phase material, said material exhibiting after calcination, an X-ray diffraction pattern with at least one peak at a d-spacing greater than about 18 Å Units with a relative intensity of 100 and having a benzene adsorption capacity of greater than 15 grams per 100 grams of said material at 50 torr and 25° C.

DETAILED DESCRIPTION OF THE PREFERRED EMBODIMENTS

By supporting a zirconium, copper and/or nickel metal on the M41S surfaces, it is possible to selectively sorb from solution large organic molecules which are too large to enter the pores of microporous molecular sieves, such as ZSM-5. It has now been found that zirconium, nickel and/or copper metals impart unique sorption properties to the M41S materials for selective sorption of bulky organic molecules.

The sorption process of the present invention uses a synthetic composition of matter comprising an ultra-large pore size crystalline phase. This material may be an inorganic, porous, non-layered, crystalline phase material which can be characterized (in its calcined form) by an X-ray diffraction pattern with at least one peak at a d-spacing greater than about 18 Angstroms with a relative intensity of 100 and a benzene sorption capacity of greater than 15 grams of benzene per 100 grams of the material at 50 torr and 25° C. This material, identified as M41S, and its preparation and properties are described in further detail in U.S. Pat. No. 5,102,643, incorporated herein by reference. TMA aluminosilicate prepared by the method of the present invention may be formed in situ without explicit preparation in M41S synthesis.

The preferred form of the crystalline material is an inorganic, porous material having a hexagonal arrangement of uniformly sized pores with a maximum perpendicular cross-section pore diameter of at least about 13 Å Units, and typically within the range of from about 13 Å Units to about 200 Å Units, identified as MCM-41. This material exhibits a hexagonal electron diffraction pattern that can be indexed with a $d_{100}$ value greater than about 18 Angstroms which corresponds to at least one peak in the X-ray diffraction pattern. This material and its preparation and properties are described in further detail in U.S. Pat. No. 5,098,684, incorporated herein by reference. TMA aluminosilicate prepared in accordance with the present invention is particularly useful for the preparation of high alumina content MCM-41, e.g. with a silica to alumina ratio less than about 30:1, more particularly less than about 20:1.

The methodology and procedures herein describe the synthesis of the crystalline oxide materials which are formed by the use of the broad range of amphiphilic compounds with particular emphasis on cationic amphiphiles. These compounds serve as liquid crystal templates in directing the formation of these new species. In a general context the invention involves the formation of highly-ordered inorganic oxide structures in any medium wherein the inorganic oxide structure that forms is defined by the solvent domains (e.g., aqueous domains) in the liquid crystalline structures. Optionally, the organic amphiphile may be removed by washing and drying, or by calcination in air, which then leaves a porous inorganic material with highly uniform, accessible pores.

The pore diameters of mesoporous, inorganic phases of this invention may also be altered by the addition of auxiliary organics to the reaction mixture. A variety of organic molecules of varying polarity may serve as auxiliary organic swelling agents in the preparation of the mesoporous materials. A variety of nonpolar organics, such as alkylated aromatics and straight or branched chain hydrocarbons are effective in increasing the pore dimension of these materials. Agents which produce swelled versions of the hexagonal phase as determined from X-ray powder diffraction patterns (3–4 peaks related by hexagonal constraints) are generally nonpolar aromatics possessing short aliphatic chains. Straight and branched chain hydrocarbons in the $C_5$–$C_{12}$ range are also effective in increasing pore size; however, the products often exhibit an apparent mixture of phases. Polar organic species, including alcohols, aldehydes, ketones and ethers, were found to be ineffective in increasing pore size of these materials, and in several cases, were found to disrupt the synthesis resulting in the isolation of completely amorphous materials. These results support a swelling mechanism in which the auxiliary organic is solubilized by surfactant micelles. Organics which are non-polar and thus hydrophobic are susceptible to solubilization in the micellar interior and are found to be effective swelling agents. Those organics which have considerable polar character are insoluble in the micelles interior and are therefore incapable of micellar swelling. These species produce no increase in pore dimension of the resulting products. These results are consistent with established principles concerning the concept of organic solubilization in micellar systems.

Although the reaction mixtures of the present invention contain several other chemical components/phases/ions which will affect the CMC, the overall surfactant concentrations (surfactant:total water) are always well above the CMC. Thus, in the present invention, a variety of amphiphile types have been employed as liquid crystal templates in the formation of novel mesoporous materials. Furthermore, alteration of even one type of amphiphile may lead to the formation of varied pore dimension.

In the preparation of mesoporous phases described herein, the amphiphile chain length is reflected in the nature of the final product. The effect of chain length variation of alkyltrimethylammonium amphiphile cations used in the synthesis of the present mesoporous materials is clearly demonstrated by the variation in pore diameter of the final products. A range of pore sizes for the hexagonal materials is possible based on the carbon chain length. For example, the hexagonal phase of the mesoporous material may be prepared with alkyltrimethylammonium surfactant cations of carbon chain length $C_9$–$C_{18}$, and these materials will exhibit pore sizes increasing with increasing carbon chain length.

The exploitation of the properties of amphiphilic compounds and their aggregated micellar forms in the formation of a variety of new inorganic oxide phases is described herein. In addition, a more general concept involves the formation of inorganic oxide structures formed from any aqueous or non-aqueous liquid crystal-containing medium. Another example of a novel liquid crystal synthesis system is the formation of inorganic oxide structures from reverse micelle systems. In these systems, at high amphiphile concentration, the liquid crystal template might be the water phase with the inorganic structure forming in the "oil" phase.

The oxide materials described herein may be inorganic, porous materials having a pore size of at least about 13 Angstroms. More particularly, the pore size of the present materials may be within the range of from about 13 Angstroms to about 200 Angstroms. Certain of these novel oxide compositions may exhibit a hexagonal electron diffraction pattern that can be indexed with a $d_{100}$ value greater than about 18 Angstroms, and a benzene adsorption capacity of greater than about 15 grams benzene/100 grams crystal at 50 torr and 25° C. Certain of these oxide materials may have a hexagonal arrangement of uniformly sized pores.

To the extent desired, the original ions of the as-synthesized material described herein can be further replaced in accordance with techniques well known in the art, at least in part, by ion exchange with other ions. Examples of such replacing ions include metal ions, hydrogen ions, hydrogen precursor, e.g. ammonium, ions and mixtures thereof. Particular examples of such ions are those which tailor the catalytic activity for certain hydrocarbon conversion reactions. Replacing ions include hydrogen, rare earth metals and metals of Groups IA (e.g. K), IIA (e.g. Ca), VIIA (e.g. Mn), VIIIA (e.g. Ni), IB (e.g. Cu), IIB (e.g. Zn), IIIB (e.g. In), IVB (e.g. Sn), and VIIB (e.g. F) of the Periodic Table of the Elements (Sargent-Welch Scientific Co. Cat. No. S-18806, 1979) and mixtures thereof.

Certain of the oxide materials described herein may be readily identified as crystalline materials. The term "crystalline" is meant herein as having sufficient order to produce at least one peak in a diffraction pattern from electromagnetic radiation or particle beams. These crystalline materials may have a diffraction pattern produced, for example, by X-ray, electron or neutron diffraction. These crystalline materials may have sufficient thermal stability to retain the crystallinity thereof after being subjected to calcination conditions to remove organic material from the as-synthesized forms thereof.

Certain of the oxide materials described herein may be readily identified as mesoporous materials. These mesoporous materials may have extremely large pore windows, and high sorption capacity. The term "mesoporous" is used here to indicate materials having pores within the range of from about 13 Angstroms to about 200 Angstroms. The materials described herein may have uniform pores within the range of from about 13 Angstroms to about 200 Angstroms, more usually from about 15 Angstroms to about 100 Angstroms. For the purposes of this disclosure, a working definition of "porous" is a material that adsorbs at least 1 gram of a small molecule, such as Ar, $N_2$, n-hexane or cyclohexane, per 100 grams of the solid.

Certain of the porous oxide materials described herein can be distinguished from other porous inorganic solids by the regularity of their large open pores, whose pore size is greater than that of microporous zeolites, but whose regular arrangement and uniformity of size (pore size distribution within a single phase of, for example, ±25%, usually ±15% or less of the average pore size of that phase) resemble those of zeolites.

Certain forms of the present materials may give rise to characteristic X-ray diffraction patterns, which serve to identify these materials as hexagonal or cubic, as well as to distinguish these materials from lamellar materials or other materials such as known microporous zeolites, layered materials, pillared materials and amorphous materials. Such patterns may have at least two peaks. The positions of these peaks vary with changes in the pore diameters of the materials, but the ratios of d-spacings of those peaks will remain fixed. Using $d_1$ to indicate the d-spacing of the strongest peak in the X-ray diffraction pattern (relative intensity=100), the X-ray diffraction pattern of certain materials produced using amphiphilic compounds exhibit $d_1$ at a position greater than about 18 Angstroms d-spacing and at least one additional weaker peak with d-spacing $d_2$ such that the ratios of these d-spacings relative to $d_1$ correspond to the ranges given in X-ray diffraction pattern Tables set forth hereinafter.

The hexagonal form of the present material, MCM-41 may have an X-ray diffraction pattern with one or more peaks. If only one peak is observed in this pattern, it may be necessary to employ more sensitive techniques, such as electron diffraction by TEM as described hereinafter, in order to confirm the hexagonal symmetry of MCM-41.

X-ray patterns of MCM-41 having 2 or more peaks may have the values given in Table 1.

TABLE 1

| d-spacing Angstroms | $d_n/d_1$ | Relative Intensity |
| --- | --- | --- |
| $d_1 \geq \sim 18$ | 1.0 | 100 |
| $d_2$ | 0.58 ± 0.06 | W |

X-ray patterns of MCM-41 having 3 or more peaks may have the values given in Table 2.

TABLE 2

| d-spacing Angstroms | $d_n/d_1$ | Relative Intensity |
| --- | --- | --- |
| $d_1 \geq \sim 18$ | 1.0 | 100 |
| $d_2$ | 0.58 ± 0.06 | W |
| $d_3$ | 0.50 ± 0.02 | W |

X-ray patterns of MCM-41 having 4 or more peaks may have the values given in Table 3.

TABLE 3

| d-spacing Angstroms | $d_n/d_1$ | Relative Intensity |
| --- | --- | --- |
| $d_1 \geq \sim 18$ | 1.0 | 100 |
| $d_2$ | 0.58 ± 0.06 | W |
| $d_3$ | 0.50 ± 0.02 | W |
| $d_4$ | 0.38 ± 0.02 | W |

The most regular preparations of the hexagonal form of the present mesoporous material give an X-ray diffraction pattern with a few distinct maxima in the extreme low angle region. The positions of these peaks approximately fit the positions of the hkO reflections from a hexagonal lattice. The X-ray diffraction pattern, however, is not always a sufficient indicator of the presence of these materials, as the degree of regularity in the microstructure and the extent of repetition of the structure within individual particles affect the number of peaks that will be observed. Indeed, preparations with only one distinct peak in the low angle region of the X-ray diffraction pattern have been found to contain substantial amounts of the present material in them. Other techniques to illustrate the microstructure of this material are transmission electron microscopy and electron diffraction. Properly oriented specimens of the hexagonal form of the present material show a hexagonal arrangement of large channels and the corresponding electron diffraction pattern gives an approximately hexagonal arrangement of diffraction maxima. The $d_{100}$ spacing of the electron diffraction patterns is the distance between adjacent spots on the hkO projection of the hexagonal lattice and is related to the repeat distance $a_0$ between channels observed in the electron micrographs through the formula $d_{100}=a_0\sqrt{3/2}$. This $d_{100}$ spacing observed in the electron diffraction patterns corresponds to the d-spacing of a low angle peak in the X-ray diffraction pattern of the material. The most highly ordered preparations of MCM-41 obtained so far have 20–40 distinct spots observable in the electron diffraction patterns. These patterns can be indexed with the hexagonal hkO subset of unique reflections of 100, 110, 200, 210, etc., and their symmetry-related reflections.

In its calcined form, the crystalline mesoporous material described herein may have an X-ray diffraction pattern with at least one peak at a position greater than about 18 Angstrom Units d-spacing (4.909 degrees two-theta for Cu K-alpha radiation) which corresponds to the $d_{100}$ value of the electron diffraction pattern of the material, and an equilibrium benzene adsorption capacity of greater than about 15 grams benzene/100 grams crystal at 50 torr and 25° C. (basis: crystal material having been treated in an attempt to insure no pore blockage by incidental contaminants, if necessary).

Certain of the calcined crystalline non-layered materials described herein may be characterized by an X-ray diffraction pattern with at least two peaks at positions greater than about 10 Angstrom Units d-spacing (8.842 degrees two-theta for Cu K-alpha radiation), at least one of which is at a position greater than about 18 Angstrom Units d-spacing, and no peaks at positions less than about 10 Angstrom units d-spacing with relative intensity greater than about 20% of the strongest peak. The X-ray diffraction pattern of calcined materials described herein may have no peaks at positions less than about 10 Angstrom units d-spacing with relative intensity greater than about 10% of the strongest peak. In any event, at least one peak in the X-ray diffraction pattern will have a d-spacing that corresponds to the $d_{100}$ value of the electron diffraction pattern of the material.

Certain forms of this material appear to have a hexagonal arrangement of large open channels that can be synthesized with open internal diameters from about 13 Angstroms to about 200 Angstroms. These forms are referred to herein as hexagonal forms. The term "hexagonal" is intended to encompass not only materials that exhibit mathematically perfect hexagonal symmetry within the limits of experimental measurement, but also those with significant observable deviations from that ideal state. A working definition as applied to the microstructure of the hexagonal form of the present mesoporous material would be that most channels in the material would be surrounded by six nearest neighbor channels at roughly the same distance. Defects and imperfections may cause significant numbers of channels to violate this criterion to varying degrees, depending on the quality of the material's preparation. Samples which exhibit as much as ±25% random deviation from the average repeat distance between adjacent channels still clearly give recognizable images of the hexagonal form of the present ultra-large pore materials. Comparable variations are also observed in the $d_{100}$ values from the electron diffraction patterns.

To illustrate the nature of the mesoporous material described herein, samples of these materials may be studied by transmission electron microscopy (TEM). TEM is a technique used to reveal the microscopic structure of materials, including crystalline materials. In order to illuminate the microstructure of materials by TEM, samples must be thin enough for an electron beam to pass through them, generally about 500–1000 Angstrom units or so thick. When the crystals of the present materials are too thick, they should be prepared for study by ultramicrotomy. While time consuming, this technique of sample preparation is quite familiar to those skilled in the art of electron microscopy. The materials may be embedded in a resin, e.g., a commercially available low viscosity acrylic resin L.R. WHITE (hard), which is then cured at about 80° C. for about 1½ hours. Thin sections of the block may be cut on an ultramicrotome using a diamond knife and sections in the thickness range 500–1000 Angstrom units may be collected on fine mesh electron microscope support grids. An LKB model microtome with a 45° C. diamond knife edge may be used; the support grids may be 400 mesh copper grids. After evaporation of a thin carbon coating on the sample to prevent charging in the microscope (light gray color on a white sheet of paper next to the sample in the evaporator), the samples are ready for examination in the TEM.

High resolution TEM micrographs show projections of structure along the direction that the sample is viewed. For this reason, it is necessary to have a sample in specific orientations to see certain details of the microstructure of the material. For crystalline materials, these orientations are most easily chosen by observing the electron diffraction pattern (EDP) that is produced simultaneously with the electron microscope image. Such EDP's are readily produced on modern TEM instruments using, e.g., the selected area field limiting aperture technique familiar to those skilled in the art of electron microscopy. When an EDP with the desired arrangement of diffraction spots is observed, the corresponding image of the crystal giving that EDP will reveal details of the microstructure along the direction of projection indicated by the EDP. In this way, different projections of a crystal's structure can be observed and identified using TEM.

In order to observe the salient features of the hexagonal form of the present mesoporous material, it is necessary to view the material in an orientation wherein the corresponding EDP gives a hexagonal arrangement of diffraction spots from a single individual crystal. If multiple crystals are present within the field limiting aperture, overlapping diffraction patterns will occur that can be quite difficult to interpret. The number of diffraction spots observed depends to a degree upon the regularity of the crystalline arrangement in the material, among other things. At the very least, however, the inner ring of bright spots should be observed to obtain a good image. Individual crystals can be manipulated by specimen tilt adjustments on the TEM until this orientation is achieved. More often, it is easier to take advantage of the fact that the specimen contains many randomly oriented crystals and to simply search through the sample until a crystal giving the desired EDP (and hence orientation) is located.

Microtomed samples of materials may be examined by the techniques described above in a JEOL 200 CX transmission electron microscope operated at 200,000 volts with an effective 2 Angstrom objective aperture in place. The instrument has a point-to-point resolution of 4.5 Angstroms. Other experimental arrangements familiar to one skilled in the art of high resolution (phase contrast) TEM could be used to produce equivalent images provided care is taken to keep the objective lens on the underfocus (weak lens) side of the minimum contrast lens current setting.

The application of the above-mentioned TEM techniques to particular samples is described in Example 23 of the aforementioned U.S. Pat. No. 5,098,684.

X-ray patterns of the cubic form of the present material (hereinafter also referred to as MCM-48) having 2 or more peaks may have the values given in Table 4.

TABLE 4

| d-spacing Angstroms | $d_n/d_1$ | Relative Intensity |
| --- | --- | --- |
| $d_1 \geq \sim 18$ | 1.0 | 100 |
| $d_2$ | $0.87 \pm 0.06$ | W-M |

X-ray patterns of MCM-48 having 3 or more peaks may have the values given in Table 5.

TABLE 5

| d-spacing Angstroms | $d_n/d_1$ | Relative Intensity |
| --- | --- | --- |
| $d_1 \geq \sim 18$ | 1.0 | 100 |
| $d_2$ | $0.87 \pm 0.06$ | W-M |
| $d_3$ | $0.52 \pm 0.04$ | W |

X-ray patterns of MCM-48 having 5 or more peaks may have the values given in Table 6.

TABLE 6

| d-spacing Angstroms | $d_n/d_1$ | Relative Intensity |
| --- | --- | --- |
| $d_1 \geq \sim 18$ | 1.0 | 100 |
| $d_2$ | $0.87 \pm 0.06$ | W-M |
| $d_3$ | $0.55 \pm 0.02$ | W |
| $d_4$ | $0.52 \pm 0.01$ | W |
| $d_5$ | $0.50 \pm 0.01$ | W |

If the reaction mixture has a composition outside the scope of the present invention, a lamellar form of an oxide material may be produced. X-ray patterns of this lamellar form of the material having 2 or more peaks may have the values given in Table 7.

TABLE 7

| d-spacing Angstroms | $d_n/d_1$ | Relative Intensity |
| --- | --- | --- |
| $d_1 \geq \sim 18$ | 1.0 | 100 |
| $d_2$ | $0.50 \pm 0.06$ | W |

X-ray patterns of this lamellar material having 3 or more peaks may have the values given in Table 8.

TABLE 8

| d-spacing Angstroms | $d_n/d_1$ | Relative Intensity |
| --- | --- | --- |
| $d_1 \geq \sim 18$ | 1.0 | 100 |
| $d_2$ | $0.50 \pm 0.06$ | W |
| $d_3$ | $0.33 \pm 0.06$ | W |

X-ray patterns of this lamellar material having 4 or more peaks may have the values given in Table 9.

TABLE 9

| d-spacing Angstroms | $d_n/d_1$ | Relative Intensity |
|---|---|---|
| $d_1 \geq \sim 18$ | 1.0 | 100 |
| $d_2$ | 0.50 ± 0.06 | W |
| $d_3$ | 0.33 ± 0.06 | W |
| $d_4$ | 0.25 ± 0.06 | W |

The X-ray diffraction pattern for the lamellar material has no peaks at positions above 10 degrees 2 theta with an intensity above 10% of the strongest peak.

Most forms of MCM-41 and MCM-48 are quite thermally stable. For example, the as-synthesized forms of these materials may be subjected to calcination sufficient to remove organics, e.g., occluded surfactants from the reaction mixtures, without measurably degrading the crystallinity of the materials, as noted by changes in the X-ray diffraction patterns of the calcined materials in comparison with the X-ray diffraction patterns of the as-synthesized materials. It should be noted, however, that the presence or absence of organic material within the channels of the porous material will substantially affect the relative intensities of the peaks listed in the Tables, particularly resulting in enhanced relative intensities of the shorter d-spacing peaks. The ratios of d-spacings $d_n/d_1$, however, will not be substantially affected. These calcination conditions may include calcination of the as-synthesized material in nitrogen at 540° C. for one hour, followed by calcination in air at 540° C. for 6 hours. The above-mentioned X-ray diffraction pattern Tables for MCM-41 and MCM-48 were mostly derived from the calcined forms of these materials, which were calcined under the above-mentioned conditions including a temperature of 540° C. Accordingly, these X-ray diffraction pattern Tables especially pertain to forms of MCM-41 and MCM-48, which are calcined one or more times under these conditions. However, it will be understood that the d-spacing ratios $d_n/d_1$ in these X-ray diffraction pattern Tables also pertain to other forms of MCM-41 and MCM-48, including as-synthesized forms or other forms, such as where occluded surfactant from the reaction mixture has been totally or partially removed by other treatments, such as calcination under different conditions, washing with an appropriate solvent, ion exchange or combinations of such treatments. Material in the channels of these materials may affect the relative intensities of the peaks in the Tables.

Certain as-synthesized forms of MCM-41 and MCM-48 may not be sufficiently thermally stable to withstand calcination conditions without undergoing substantial degradation in crystallinity and/or porosity. However, certain thermally unstable, as-synthesized forms of MCM-41 and MCM-48 may be stabilized by a stabilization treatment disclosed in U.S. Pat. No. 5,156,829, the entire disclosure of which is expressly incorporated herein by reference. This stabilization treatment involves contacting the material with a compound of the formula

$M'X'_2Y'_n$ where M' is boron, aluminum, silicon or titanium; X' represents alkyl halides having from 1–6 carbon atoms and/or alkoxides having 1–6 carbon atoms; Y' represents X and/or alkyls with 1–12 carbon atoms; and n=1–2. Examples of compounds of the formula $M'X'_2Y'_n$ are tetraethylorthosilicate, tetramethylorthosilicate, titanium tetraethoxide, aluminum tri-sec-butoxide and aluminum tri-iso-butoxide. The treatment mixture containing crystalline material and $M'X'_2Y'_n$ may also include solvents as are known in the art, preferably organic solvents such as alcohols and diols having 1 to 6 carbon atoms ($C_{1-6}$). The ratio of crystalline material to treatment compound may vary within wide limits, e.g., from about 1:100 to about 100:1. The temperature at which the treatment method may be carried out is limited, as a practical matter, only by the freezing or boiling point (including the boiling point under pressure) of the treatment mixture, and the time of contacting is not critical and may be, for example, from about 1 to about 24 hours, preferably from about 1 to about 12 hours. After treatment, the treated product is preferably calcined, preferably in the presence of oxygen, under conditions sufficient to convert the compound to an oxide of M'.

Without being bound by any theory, it is theorized that this stabilization treatment of MCM-41 and MCM-48 results in the insertion of additional matter into the pore walls, thereby resulting in stronger, more stable pore walls. It will be understood that the above-mentioned X-ray diffraction pattern Tables for MCM-41 and MCM-48 represent forms of MCM-41 and MCM-48, which have been subjected to stabilization treatments, such as those disclosed in U.S. Pat. No. 5,156,829.

The calcined inorganic, crystalline material described herein may have a pore size of about 13 Angstroms or greater as measured by physisorption measurements, hereinafter more particularly set forth. It will be understood that pore size refers to the diameter of the pore. The pores of the present hexagonal form of these materials are believed to be essentially cylindrical.

The equilibrium benzene adsorption capacity characteristic of this material is measured on the basis of no pore blockage by incidental contaminants. For instance, the sorption test will be conducted on the crystalline material phase having any pore blockage contaminants and water removed by ordinary methods. Water may be removed by dehydration techniques, e.g. thermal treatment. Pore blocking inorganic amorphous materials, e.g. silica, and organics may be removed by contact with acid or base or other chemical agents such that the detrital material will be removed without detrimental effect on the mesoporous crystal described herein.

The following description provides examples of how physisorption measurements, particularly argon physisorption measurements, may be taken. Examples 22(a) and 22(b) of the aforementioned U.S. Pat. No. 5,098,684, filed Dec. 10, 1990, provide demonstrations of these measurements as applied to particular samples.

To determine the pore diameters of products with pores up to about 60 Angstroms in diameter, 0.2 gram samples of the products may be placed in glass sample tubes and attached to a physisorption apparatus as described in U.S. Pat. No. 4,762,010, which is incorporated herein by reference.

The samples may be heated to 300° C. for 3 hours in vacuo to remove adsorbed water. Thereafter, the samples may be cooled to 87° K by immersion of the sample tubes in liquid argon. Metered amounts of gaseous argon may then be admitted to the samples in stepwise manner as described in U.S. Pat. No. 4,762,010, column 20. From the amount of argon admitted to the samples and the amount of argon left in the gas space above the samples, the amount of argon adsorbed can be calculated. For this calculation, the ideal gas law and the calibrated sample volumes may be used. (See also S. J. Gregg et al., *Adsorption. Surface Area and Porosity*, 2nd ed., Academic Press, (1982)). In each instance, a graph of the amount adsorbed versus the relative pressure above the sample, at equilibrium, constitutes the adsorption isotherm. It is common to use relative pressures which are obtained by forming the ratio of the equilibrium pressure and the vapor pressure $P_o$ of the adsorbate at the temperature where the isotherm is measured. Sufficiently small amounts of argon may be admitted in each step to generate, e.g., 168 data points in the relative pressure range from 0 to 0.6. At least about 100 points are required to define the isotherm with sufficient detail.

The step (inflection) in the isotherm indicates filling of a pore system. The size of the step indicates the amount adsorbed, whereas the position of the step in terms of $P/P_o$ reflects the size of the pores in which the adsorption takes place. Larger pores are filled at higher $P/P_o$. In order to better locate the position of the step in the isotherm, the derivative with respect to log $(P/P_o)$ is formed. The position of an adsorption peak in terms of log $(P/P_o)$ may be converted to the physical pore diameter in Angstroms by using the following formula:

$$\log(P/P_o) = \frac{K}{d - 0.38}\left(\frac{S^4}{3(L - D/2)^3} - \frac{S^{10}}{9(L - D/2)^9} - \frac{S^4}{3(D/2)^3} + \frac{S^{10}}{9(D/2)^9}\right)$$

wherein d=pore diameter in nanometers, K=32.17, S=0.2446, L=d+0.19, and D=0.57.

This formula is derived from the method of Horvath and Kawazoe (G. Horvath et al., *J. Chem. Eng. Japan,* 16 (6) 470(1983)). The constants required for the implementation of this formula were determined from a measured isotherm of $AlPO_4$–5 and its known pore size. This method is particularly useful for porous materials having pores of up to about 60 Angstroms in diameter. For materials having a pore size greater than 9 Angstroms, the plot of log $(P/P_o)$ vs. the derivative of uptake may reveal more than one peak. More particularly, a peak may be observed at $P/P_o$=0.0027. This peak reflects adsorption on the walls of the pores and is not otherwise indicative of the size of the pores of a given material.

A material with pore size of 39.6 Angstroms has a peak occurring at log $(P/P_o)$=–0.4 or $P/P_o$=0.4. A value of $P/P_o$ of 0.03 corresponds to 13 Angstroms pore size.

The above method of Horvath and Kawazoe for determining pore size from physisorption isotherms was intended to be applied to pore systems of up to 20 Angstroms diameter; but with some care as above detailed, its use can be extended to pores of up to 60 Angstroms diameter, as described above.

In the pore regime above 60 Angstroms diameter, however, the Kelvin equation can be applied. It is usually given as:

$$\ln(P/P_o) = \frac{-2\sqrt{V}}{r_k RT}\cos\theta$$

where:
√=surface tension of sorbate
V=molar volume of sorbate
θ=contact angle (usually taken for practical reasons to be 0)
R=gas constant
T=absolute temperature
$r_k$=capillary condensate (pore) radius
$P/P_o$=relative pressure (taken from the physisorption isotherm)

The Kelvin equation treats adsorption in pore systems as a capillary condensation phenomenon and relates the pressure at which adsorption takes place to the pore diameter through the surface tension and contact angle of the adsorbate (in this case, argon). The principles upon which the Kelvin equation are based are valid for pores in the size range 50 to 1000 Angstroms diameter. Below this range the equation no longer reflects physical reality, since true capillary condensation cannot occur in smaller pores; above this range the logarithmic nature of the equation precludes obtaining sufficient accuracy for pore size determination.

The particular implementation of the Kelvin equation often chosen for measurement of pore size is that reported by Dollimore and Heal (D. Dollimore and G. R. Heal, *J. Applied Chem,* 14, 108 (1964)). This method corrects for the effects of the surface layer of adsorbate on the pore wall, of which the Kelvin equation proper does not take account, and thus provides a more accurate measurement of pore diameter. While the method of Dollimore and Heal was derived for use on desorption isotherms, it can be applied equally well to adsorption isotherms by simply inverting the data set.

Non-lamellar forms of materials described herein, such as MCM-48 and, especially, MCM-41, may be distinguished from other oxide materials in terms of their pore sizes and the uniformity of their pore systems. A distinctive feature of certain forms of MCM-41 and MCM-48 is that these materials are (1) non-lamellar (e.g., non-layered or non-pillared), (2) have pore sizes over 13 Angstroms (e.g., over 15 Angstroms, even over 20 Angstroms), and (3) have an X-ray diffraction pattern with at least one peak, e.g., at a d-spacing of at least about 18 Angstroms.

Another indication of the uniformity of pore systems in these materials is apparent from the physisorption characteristics of these materials. More particularly, the plots of log $(P/P_o)$ vs. the derivative of uptake may reveal sharp peaks not observed for other large-pore materials, such as amorphous materials and pillared, layered materials.

Another distinctive feature of materials described herein, especially MCM-41 and MCM-48, is the extremely large surface areas of these materials. More particularly, certain forms of MCM-41 and MCM-48 may have surface areas over 800 $m^2/g$. Especially distinct forms of these materials with high surface areas include those with especially large pore sizes (e.g., greater than 20 Angstroms or 30 Angstroms), particularly those materials which are observed to have uniform pore size distributions.

A further distinctive feature of materials described herein, especially MCM-41 and MCM-48, is the large pore volumes of these materials. One indication of the pore volumes of these materials is their benzene sorption capacity. Pore volumes may also be measured by physisorption measurements. Such measurements of certain forms of materials described herein, such as forms of MCM-41 and MCM-48 may reveal pore volumes of greater than 0.40 cc/g.

As mentioned hereinabove the large pore sizes of materials described herein may be confirmed by physisorption measurements, especially argon physisorption measurements. Another indication of large pore sizes of materials described herein may be provided by determining their ability to sorb large probe molecules, such as molecules having kinetic diameters of at least 8.5 Angstroms, e.g., 1,3,5-triisopropylbenzene.

X-ray diffraction data were collected on a Scintag PAD X automated diffraction system employing theta-theta geometry, Cu K-alpha radiation, and an energy dispersive X-ray detector. Use of the energy dispersive X-ray detector eliminated the need for incident or diffracted beam monochromators. Both the incident and diffracted X-ray beams were collimated by double slit incident and diffracted collimation systems. The slit sizes used, starting from the X-ray tube source, were 0.5, 1.0, 0.3 and 0.2 mm, respectively. Different slit systems may produce differing intensities for the peaks. The mesoporous materials described herein that have the largest pore sizes may require more highly collimated incident X-ray beams in order to resolve the low angle peak from the transmitted incident X-ray beam.

The diffraction data were recorded by step-scanning at 0.04 or less degrees of two-theta, where theta is the Bragg angle, and a counting time of 10 seconds for each step. The interplanar spacings, d's, were calculated in Angstrom units (A), and the relative intensities of the lines, $I/I_o$, where $I_o$ is one-hundredth of the intensity of the strongest line, above background, were derived with the use of a profile fitting routine. The intensities were uncorrected for Lorentz and polarization effects. The relative intensities are given in terms of the symbols vs=very strong (75–100), s=strong (50–74), m=medium (25–49) and w=weak (0–24). It should be understood that diffraction data listed as single lines may consist of multiple overlapping lines which under certain conditions, such as very high experimental resolution or crystallographic changes, may appear as resolved or partially resolved lines. Typically, crystallographic changes can include minor changes in unit cell parameters and/or a change in crystal symmetry, without a substantial change in structure. These minor effects, including changes in relative intensities, can also occur as a result of differences in cation content, framework composition, nature and degree of pore filling, thermal and/or hydrothermal history, and peak width/shape variations due to particle size/shape effects, structural disorder or other factors known to those skilled in the art of X-ray diffraction.

The equilibrium benzene adsorption capacity may be determined by contacting the crystalline material described herein, after dehydration or calcination at, for example, about 540° C. for at least about one hour and other treatment, if necessary, in an attempt to remove any pore blocking contaminants, at 25° C. and 50 torr benzene until equilibrium is reached. The weight of benzene sorbed is then determined as more particularly described hereinafter.

When used as a sorbent component, the crystalline material described herein should be subjected to treatment to remove part or all of any organic constituent.

The present composition is used as a sorbent component in intimate combination with zirconium, copper and/or nickel. Such component can be in the composition by way of co-crystallization, exchanged into the composition to the extent a Group IIIB element, e.g. aluminum, is in the structure, impregnated therein or intimately physically admixed therewith. Such component can be impregnated in. Thus, suitable platinum compounds for this purpose include chloroplatinic acid, platinous chloride and various compounds containing the platinum amine complex.

The above crystalline material, especially in its metal, hydrogen and ammonium forms can be beneficially converted to another form by thermal treatment (calcination). This thermal treatment is generally performed by heating one of these forms at a temperature of at least 400° C. for at least 1 minute and generally not longer than 20 hours, preferably from about 1 to about 10 hours. While subatmospheric pressure can be employed for the thermal treatment, atmospheric pressure is desired for reasons of convenience, such as in air, nitrogen, ammonia, etc. The thermal treatment can be performed at a temperature up to about 750° C.

The crystalline material described herein, may be dehydrated, at least partially. This dehydration can be done by heating to a temperature in the range of 200° C. to 595° C. in an atmosphere such as air, nitrogen, etc. and at atmospheric, subatmospheric or superatmospheric pressures for between 30 minutes and 48 hours. Dehydration can also be performed at room temperature merely by placing the composition in a vacuum, but a longer time is required to obtain a sufficient amount of dehydration.

The reaction mixture for preparing crystalline materials described herein may comprise a source of one or more oxides, an amphiphilic compound and a solvent or solvent mixture. This amphiphilic compound is also referred to herein as the primary organic agent (R') and is more particularly described hereinafter. The solvent or solvent mixture may comprise, for example, $C_1$–$C_6$ alcohols, $C_1$–$C_6$ diols and/or water, especially water. Optional components of the reaction mixture include (1) a source of alkali or alkaline earth metal (M), e.g. sodium or potassium, cations, (2) an additional organic agent (R"), hereinafter more particular described, and (3) an organic swelling agent, also referred to herein as an auxiliary organic agent (R'''), hereinafter more particularly described.

The reaction mixture may have the mole ratio $$\text{Solvent}/(R'_2O+M_2O)$$

of at least 45. When R' is cetyltrimethylammonium and this ratio is 10–45, the formation of the above-mentioned lamellar phase is favored. When R' is cetyltrimethylammonium and this ratio is 45–92, the formation of the above-mentioned cubic phase (MCM-48) is favored. When R' is cetyltrimethylammonium and this ratio is greater than 92, e.g., 92–300, the formation of the above-mentioned hexagonal phase (MCM-41) is favored. It will be understood that mixtures of these phases may be produced near the transition values of these ratios. For example, mixtures of the hexagonal phase and the cubic phase may be produced at ratios of 92–100.

The reaction mixture may have the mole ratio $$(R'_2O+R''_2O)/(SiO_2+Al_2O_3)$$

of 0.01–2.0, e.g., 0.03–1.0, e.g., 0.3–1.0, e.g., 0.3–0.6. This mole ratio is calculated on a basis wherein it is assumed that all of the hydrolyzable silicon and aluminum compounds in the reaction mixture are hydrolyzed. The pH of the reaction mixture may be from about 7 to 14, e.g., from about 9 to 14.

The components of the reaction mixture may be combined in any order. In some instances, it may be desired to combine the solvent and primary organic agent (R') prior to adding the source of oxide to this preformed mixture. Upon the formation of the reaction mixture, this mixture may, optionally, be subjected to an aging step at low temperature, e.g., from about 0° C. to about 50° C., for a short period of time, e.g., from about 30 minutes to about 2 hours. This aging step may take place in the presence or absence of agitation of the reaction mixture.

Crystallization of the reaction mixture may take place at elevated temperature, e.g., from about 50° C. to about 200° C., e.g., from about 95° C. to about 150° C., for about 4 to about 72 hours, e.g., from about 16 to about 60 hours. The crystallization may take place under reflux conditions. The crystallization may also take place in the presence of microwave radiation under conditions specified in U.S. Pat. No. 4,778,666.

Particular methods for making MCM-41 are described in the aforementioned U.S. Pat. No. 5,102,643.

In each of the above methods, batch crystallization of the present crystalline material can be carried out under either static or agitated, e.g. stirred, conditions in a suitable reactor vessel, such as for example, polypropylene jars or teflon lined or stainless steel autoclaves. Crystallization may also be conducted continuously in suitable equipment. The total useful range of temperatures for crystallization is noted above for each method for a time sufficient for crystallization to occur at the temperature used, e.g. from about 5 minutes to about 14 days. Thereafter, the crystals are separated from the liquid and recovered.

When TMA aluminosilicate is used as the source of silica and alumina in the reaction mixture, particularly high alumina forms of the present materials may be formed. It is believed that by supplying aluminosilicate already in solution increases the dispersion and incorporation of Al atoms in the M41S framework.

By adjusting conditions of the synthesis reaction for each method, like temperature, pH and time of reaction, etc., within the above limits, embodiments of the present material with a desired degree of crystallinity or a desired average pore size may be prepared. In particular, changing the pH, the temperature or the reaction time may promote formation of product crystals with different average pore size.

A primary organic agent (R') for use in preparing the present reaction mixture is an ammonium or phosphonium ion of the formula $R_1R_2R_3R_4Q^+$, i.e:

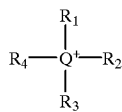

wherein Q is nitrogen or phosphorus and wherein at least one of $R_1$, $R_2$, $R_3$ and $R_4$ is aryl or alkyl of from 6 to about 36 carbon atoms, especially from 8 to 36 carbon atoms, e.g. $-C_{10}H_{21}$, $-C_{16}H_{33}$ and $-C_{18}H_{37}$, or combinations thereof, the remainder of $R_1$, $R_2$, $R_3$ and $R_4$ being selected from the group consisting of hydrogen, alkyl of from 1 to 5 carbon atoms and combinations thereof. The compound from which the above ammonium or phosphonium ion is derived may be, for example, the hydroxide, halide, silicate, or mixtures thereof.

An additional organic agent (R") may also be used. That additional organic agent may be the ammonium or phosphonium ion of the above primary organic agent formula wherein $R_1$, $R_2$, $R_3$ and $R_4$ together or separately are selected from the group consisting of hydrogen and alkyl of 1 to 5 carbon atoms and combinations thereof. Any such combination of organic agents may be in molar ratio of about 100/1 to about 0.01/1, first above listed organic agent/additional organic agent (R'/R").

Non-limiting examples of R' capable of forming micelles include cetyltrimethylammonium, cetyltrimethylphosphonium, octadecyltrimethylphosphonium, cetylpyridinium, myristyltrimethylammonium, decyltrimethylammonium, dodecyltrimethylammonium and dimethyldidodecylammonium.

In addition to the above-mentioned primary organic agent (R') and the additional organic agent (R"), the reaction mixture may also contain an auxiliary organic agent (R'''). These auxiliary organic agents are compounds which are capable of swelling micelles. Such auxiliary organic agents may be selected from the group consisting of (1) aromatic hydrocarbons and amines having from 5 to 20 carbon atoms and halogen- and $C_1-C_{14}$ alkyl-substituted derivatives thereof, (2) cyclic aliphatic hydrocarbons and amines having from 5 to 20 carbon atoms and halogen- and $C_1-C_{14}$ alkyl-substituted derivatives thereof, (3) polycyclic aliphatic hydrocarbons and amines having from 6 to 20 carbon atoms and halogen- and $C_1-C_{14}$ alkyl-substituted derivatives thereof, (4) straight and branched aliphatic hydrocarbons and amines having from 3 to 16 carbon atoms and halogen-substituted derivatives thereof, and (5) combinations thereof.

In this group of auxiliary organic agents (R''') for use in the present method, the halogen substituent in substituted derivatives may be, for example, bromine. The $C_{1-14}$ alkyl substituent in the substituted derivatives may be linear or branched aliphatic chains, such as, for example, methyl, ethyl, propyl, isopropyl, butyl, pentyl and combinations thereof. Non-limiting examples of these auxiliary organic agents include, for example, p-xylene, trimethylbenzene, triethylbenzene and triisopropylbenzene. A particular example of such an auxiliary organic agent (R''') is 1,3,5-trimethylbenzene (i.e. mesitylene).

The mole ratio of the auxiliary organic agent to the primary organic agent (R'''/R') may be from about 0.02 to about 100, e.g., from about 0.05 to about 35.

Consistent with the ability of the auxiliary organic agent to swell micelles, the pore sizes of oxides prepared from reaction mixtures containing both auxiliary and primary organic agents have been observed to be substantially larger than the pore sizes of oxides prepared from reaction mixtures lacking auxiliary organic agents. When auxiliary organic agents are used in reaction mixtures, the pore sizes of oxide materials produced may be greater than 60 Angstroms.

The use of auxiliary organic agents in the preparation of MCM-41 is described in U.S. Pat. No. 5,057,296, the entire disclosure of which is expressly incorporated herein by reference.

It should be realized that the reaction mixture components can be supplied by more than one source. The reaction mixture can be prepared either batchwise or continuously. Crystal size and crystallization time of the new crystalline material will vary with the nature of the reaction mixture employed and the crystallization conditions.

The crystals prepared by the instant invention can be shaped into a wide variety of particle sizes. Generally speaking, the particles can be in the form of a powder, a granule, or a molded product, such as an extrudate having particle size sufficient to pass through a 2 mesh (Tyler) screen and be retained on a 400 mesh (Tyler) screen. In cases where the catalyst is molded, such as by extrusion, the crystals can be extruded before drying or partially dried and then extruded.

It may be desired to incorporate the new oxide composition with another material resistant to the temperatures and other conditions employed in organic conversion processes. Such materials include active and inactive materials and synthetic or naturally occurring zeolites as well as inorganic materials such as clays, silica and/or metal oxides such as alumina, titania and/or zirconia. The latter may be either naturally occurring or in the form of gelatinous precipitates or gels including mixtures of silica and metal oxides. Use of a material in conjunction with the new crystal, i.e. combined therewith or present during synthesis of the new crystal, which is active, tends to change the conversion and/or selectivity of the catalyst in certain organic conversion processes. Inactive materials suitably serve as diluents to control the amount of conversion in a given process so that products can be obtained economically and orderly without employing other means for controlling the rate of reaction. These materials may be incorporated with naturally occurring clays, e.g. bentonite and kaolin, to improve the crush strength of the catalyst under commercial operating conditions. These materials, i.e. clays, oxides, etc., function as binders for the catalyst. It is desirable to provide a catalyst having good crush strength because in commercial use it is desirable to prevent the catalyst from breaking down into powder-like materials. These clay binders have been employed normally only for the purpose of improving the crush strength of the catalyst.

Naturally occurring clays which can be composited with the new crystal include the montmorillonite and kaolin family, which families include the subbentonites, and the kaolins commonly known as Dixie, McNamee, Georgia and Florida clays or others in which the main mineral constituent is halloysite, kaolinite, dickite, nacrite, or anauxite. Such clays can be used in the raw state as originally mined or initially subjected to calcination, acid treatment or chemical modification.

In addition to the foregoing materials, the new crystal can be composited with a porous matrix material such as silica-alumina, silica-magnesia, silica-zirconia, silica-thoria, silica-beryllia, silica-titania as well as ternary compositions such as silica-alumina-thoria, silica-alumina-zirconia, silica-alumina-magnesia and silica-magnesia-zirconia.

It may be desirable to provide at least a part of the foregoing matrix materials in colloidal form so as to facilitate extrusion of the bound catalyst component(s).

The relative proportions of finely divided crystalline material and inorganic oxide matrix vary widely, with the crystal content ranging from about 1 to about 90 percent by weight and more usually, particularly when the composite is prepared in the form of beads, in the range of about 2 to about 80 weight percent of the composite.

One of the most common approaches for incorporating the method of the present invention involves the deployment of the as-synthesized molecular sieve material into a chromatographic system. As previously mentioned, there are a wide variety of chromatography systems available including ion exchange, affinity, reverse phase, elution, column, adsorption, flat-bed, batch, thin layer, paper, gel permeation and other size exclusion-based chromatography systems as well as gas, liquid and solid chromatography. The nomenclature for the different types of chromatography is based upon either the type of mobile phase employed, the nature of the stationary phase, the nature of the interaction between the stationary phase and the substance retained by it or, alternatively, the type of technique or apparatus used in the system.

Generally, the method of the present invention can be adapted for all types of chromatography provided that the chromatography system utilizes a solid as either a separating agent or a support for the same. For example, ion exchange, affinity, elution, column, adsorption, flat-bed, batch, thin layer and gel permeation chromatographic systems all incorporate solids in this fashion. Alternatively, paper chromatography utilizes paper as a support and some liquid solvent, typically water, as a stationary phase, thereby avoiding the need for any additional solid. The mechanics involved in adapting solids for use in the various chromatographic methods set forth above are well-known to those skilled in the art and the appropriate modification are readily available in a wide variety of texts and other literature.

For example, it is well-known that if a molecular sieve material is incorporated into a chromatographic system in order to perform a size exclusion-based separation, the material is usually disposed in a suitable column or, alternatively, in another format such as a gel matrix suitable for performing gel permeation chromatography. Similarly, if the molecular sieve material is involved in ion exchange, affinity or some sorption-based chromatography, the material is usually incorporated into various chromatographic configurations, such as flat-bed, batch and column chromatography systems, depending upon the particular requirements of the separation to be performed. Furthermore, it is well-known that various chromatography techniques may be combined in order to solve unique separation problems.

In addition to its application in chromatographic techniques, the separation method of the present invention may be adapted for performing a separation in other technologies which require a solid as a means for separation or a support for the same. For example, the present method may be incorporated into a variety of membrane-based techniques including filtrations, clarifications, membrane reactions and other membrane-related separations, such as ultrafiltration, dialysis, electrodialysis, reverse osmosis, gas or liquid diffusions and facilitated transport mechanisms.

Generally, the membrane-based separations mentioned above are accomplished by incorporating the molecular sieve material into a suitable membrane after any optional modifications are performed in accordance with the method of the present invention in order to impart any additional separation selectivity to the material. In particular, the membranes utilized in these membrane-based separations can be constructed so as to incorporate any variation of the molecular sieve material described above, provided that the set of separation conditions in which the membrane operates does not appreciably inhibit the efficiency of the separation.

The material can be formed into a thin cohesive, continuous, unsupported membrane under crystallization conditions familiar to those skilled in the art. Typically, the crystallization of the material into a continuous layer is induced upon a non-porous forming surface and the material is subsequently removed in order to obtain a thin, noncomposite membrane. Examples of procedures for fabricating non-composite membranes have been described in U.S. Pat. Nos. 3,392,103, 3,499,537, 3,628,669, 3,791,969, 3,413,219 and 4,238,590, all of which are incorporated herein by reference thereto.

Alternatively, the material of the present invention may be deposited onto a porous, inorganic substrate in order to form a thin layer composite membrane. Examples of procedures involving the formation of composite membranes or filters containing dispersed particles of molecular sieve-type materials have been described in U.S. Pat. Nos. 3,266,973, 3,791,969, 4,012,206, 4,735,193 and 4,740,219, the disclosures of which are also incorporated herein by reference thereto.

The membrane can be produced, for example, by synthesis under hydrothermal conditions on a non-porous substrate forming surface, such as a polymer, a metal or glass. Suitable polymer surfaces are, for example, fluorocarbon polymers such as tetrafluoroethylene (TFE) and fluorinated ethylene-propylene polymers (FEP). Suitable metal surfaces are, for example, silver, nickel, aluminum and stainless steel. A thin layer of metal on glass or an organic polymer or other material may be used as the forming surface. A thin layer of a polymer film on glass or other material may also be used as the forming surface. The forming surface may have various configurations. For example, the surface may be flat, curved, a hollow cylinder or honeycomb-shaped.

In forming the membranes of the present invention, a non-porous surface is contacted with a chemical mixture capable of forming the desired crystalline material under crystallization conditions. After a period of time under suitable conditions, a cohesive membrane of crystallized material forms on the non-porous substrate surface. The thickness dimension of the membrane may vary from about 0.02 microns to about 1000 microns depending upon the length of time the surface is contacted with the chemical mixture and the amount of mixture provided. Other means such as varying the temperature or the ratio of crystallization mixture to forming surface area are also effective in adjusting the membrane thickness to a desired dimension.

The time of contacting of the surface with the reaction mixture may be from about 0.5 hrs. to about 72 hrs., preferably from about 1 hr. to about 10 hrs. and at a temperature ranging from about 25° C. to about 175° C., preferably from about 50° C. to about 150° C. Additionally, the contacting can be performed at atmospheric, subatmospheric or superatmospheric pressures.

After the desired period of time, the substrate, now coated with crystalline material, is removed from contact with the chemical mixture, washed with distilled water and allowed to dry. The layer of crystalline material may be removed from the non-porous surface by various means depending upon the material chosen for the forming surface. The layer may be separated from polymeric surfaces, for example, by mechanical means such as careful scraping or peeling. Removal from metal surfaces may be accomplished with the use of solvents such as acetone, or by dissolving the metal with acid such as aqueous hydrochloric or nitric acid. With a support consisting of metal or metallized material such as aluminum on glass or teflon, treatment with an aqueous mineral acid can be employed.

The membrane material may also be calcined before or after removal from the substrate for example in an inert atmosphere or in air at a temperature ranging from about 200° C. to about 700° C. for about 0.5 hrs. to about 15 hrs.

Once a membrane containing the molecular sieve material of the present invention has been formed, it may be incorporated into any suitable membrane-based separation including those mentioned above. In particular, a feedstream mixture including at least a first component at a first concentration and a second component at a second concentration is contacted with the separation membrane comprising the molecular sieve material of the present invention. The contact should occur under separation conditions such that the microstructure of the material present in the membrane affords a greater permeability of the first component through the membrane than the second component. As a result, an effluent stream is produced wherein the concentration of the second component has been substantially reduced.

Additionally, another separation technique contemplated by the method of the present invention involves utilizing the membrane as a membrane reactor. Typically, the membrane is rendered catalytically active by methods known to those skilled in the art and a feedstock is passed through the upstream face of the membrane under catalytic conditions. For cases where some or at least one of the reaction products have a higher permeability than the reactant(s), they will emerge from the downstream side of the membrane. In equilibrium limited reactions, this approach will lead to higher single-pass conversion of the reactant(s) than normally provided by thermodynamic equilibrium constraints. At least one or all of the reaction products are collected on the downstream side of the membrane.

Other applications of membranes incorporating the material of the present invention as membrane reactors are well-known in the art and generally involve two unit operations, namely a separation and a chemical reaction. Generally, product separation translates into enhanced selectivity by depressing undesirable side reactions and/or increased conversion due to equilibrium shifting and/or the same conversion at a lower temperature. Examples of membrane reactors incorporating the unique material and methods of the present invention include enzymatic catalysis for various biological laboratory manipulations such as protein hydrolysis, cellulose saccharification and monoclonal antibody production.

The following examples illustrate the process of the present invention.

EXAMPLE 1

A zirconium solution containing $(Zr_4(OH)_8(H_2O)_{16})Cl_8 \cdot 12H_2O$ species as found in the solid state, was prepared by dissolving 200 g of $ZrOCl_2 \cdot 8H_2O$ in 200 g of deionized water. The solution was stirred for 30 minutes and a clear solution was obtained.

EXAMPLE 2

MCM-41 was prepared by mixing 300 g of 29 wt.% cetyltrimethylammonium hydroxide (CTMAOH) and 90 g of tetraethylorthosilicate (TEOS) (Surfactant/Si ratio of 0.6) in a wide mouth polypropylene jar, stirred, then heated in a steam box for 48 hours. The product was filtered, washed thoroughly with water and acetone, and subsequently dried in a vacuum oven at 50° C. for 20 hrs. The solid was identified as MCM-41 by x-ray diffraction analysis. The solid sample was calcined to remove the organic by heating in $N_2$ to 540° C. and held for one hour then heated in air for 6 hours. X-ray diffraction of the calcined product exhibited the hexagonal pattern of the mesoporous MCM-41. This solid was used for preparation of the catalyst.

EXAMPLE 3

Synthesis of zirconium-containing MCM-41

A mixture of 0.13 g of the Zr solution from Example 1 and 29.7 g of distilled $H_2O$ was added to 5 g of calcined MCM-41 from Example 2. The mixture was stirred for an hour and then the liquid was evaporated at 60° C. in a vacuum oven for 17 hours. The solid was crushed to fine white powder. The Zr loading was 0.74 wt.%.

EXAMPLE 4

Synthesis of zirconium-containing MCM-41

A mixture of 0.26 g of the Zr solution from Example 1 and 29.4 g of distilled $H_2O$ was added to 5 g of calcined MCM-41 from Example 2. The mixture was stirred for an hour and then the liquid was evaporated at 60° C. in a vacuum oven for 17 hours. The solid was crushed to fine white powder. The Zr loading was 1.5 wt.%.

EXAMPLE 5

Sythesis of zirconium-containing MCM-41

A mixture of 1.4 g of the Zr solution from Example 1 and 28.6 g of distilled $H_2O$ was added to 5 g of calcined MCM-41 from Example 2. The mixture was stirred for an hour and then the liquid was evaporated at 60° C. in a vacuum oven for 20 hours. The solid was crushed to fine white powder. X-ray diffraction of the white powder exhibited that the MCM-41 lattice remained intact. The solid sample was calcined at 540° C. for 6 hours in air and the MCM-41 lattice still maintained its integrity. The Zr loading was 3.75 wt.%.

EXAMPLE 6

Synthesis of zirconium-containing MCM-41

A mixture of 2.9 g of the Zr solution from Example 1 and 27.1 g of distilled $H_2O$ was added to 5 g of calcined MCM-41 from Example 2. The mixture was stirred for an hour and then the liquid was evaporated at 60° C. in a vacuum oven for 20 hours. The solid was crushed to fine white powder. X-ray diffraction of the white powder exhibited that the MCM-41 lattice remained intact. The solid sample was calcined at 540° C. for 6 hours in air and the MCM-41 lattice still maintained its integrity. The Zr loading was 7.6 wt.%.

EXAMPLE 7

Synthesis of zirconium-containing MCM-41

A mixture of 6.5 g of the Zr solution from Example 1 and 23.5 g of distilled $H_2O$ was added to 5 g of calcined MCM-41 from Example 2. The mixture was stirred for an hour and then the liquid was evaporated at 60° in a vacuum oven for 20 hours. The solid was crushed to fine white powder. X-ray diffraction of the white powder was calcined at 540° C. for 6 hours in air and the MCM-41 lattice still maintained its integrity. The Zr loading was 15.6 wt.%.

EXAMPLE 8

Synthesis of zirconium-containing MCM-41

A mixture of 17.4 g of the Zr solution from Example 1 and 12.5 g of distilled $H_2O$ was added to 5 g of calcined MCM-41 from Example 2. The mixture was stirred for an hour and then the liquid was evaporated at 60° C. in a vacuum oven for 20 hours. The solid was crushed to fine white powder. X-ray diffraction of the white powder exhibited that the MCM-41 lattice remained intact. The solid sample was calcined at 540° C. for 6 hours in air and the MCM-41 lattice still maintained its integrity. The Zr loading was 33.0 wt.%.

EXAMPLE 9

The sorption of large organic molecules by the samples described in Examples 3–8 was examined using Chicago Sky Blue as a test organic. 50 grams of a 20 ppm Chicago Sky Blue solution at pH=3–5, were mixed with 0.2 grams $H_2O_2$ (30% in water) and 0.5 grams catalyst. The sample was heated at 50° C. with stirring for one hour. The concentration of the Chicago Sky Blue was monitored by UV-Visible spectrometry and is tabulated in Table 10, below, for the solids described in Examples 3–8.

The samples described in Examples 4–8 reduced the dye concentration by greater than 90%. The solutions were clear after the Zr-MCM-41 was filtered from solution; the solids were a dark blue color. The reduction in dye concentration measured by UV-Visible spectrometry and the visual observation of the Zr-MCM-41 color indicates that the dye was removed by adsorption. The sample described in Example 3 reduced the dye concentration by 23%. The zirconium level in Example 3 was not sufficient to reduce the dye concentration of a 20 ppm Chicago Sky Blue solution by greater than 90%.

The sorption of large organic molecules by the catalysts described in Examples 5–8 was examined using Acid Red 151. 50 grams of a 16 ppm Acid Red 151 solution at pH=3–5, were mixed with 0.2 grams $H_2O_2$ (30% in water) and 0.5 grams catalyst. The sample was heated at 50° C. with stirring for one hour. The concentration of the Acid Red 151 was monitored by UV-Visible spectrometry and is tabulated in Table 11, below, for the solids described in Examples 5–8.

The samples described in Examples 5–8 reduced the dye concentration by greater than 90%. The solutions were clear after the Zr-MCM-41 was filtered from solution; the solids were a red color. The reduction in dye concentration measured by UV-Visible spectrometry and the visual observation of the Zr-MCM-41 color indicates that the dye was removed by adsorption.

TABLE 10

Selective Sorption of Chicago Sky Blue at pH = 3–5, T = 50° C., 100 ppm $H_2O_2$, and t = 60 minutes by Zr/MCM-41 materials

| Example No. | Initial dye Absorbance @λ = 614 nm | Final dye Absorbance @λ = 614 nm | Solution Color | Filtrate Color | % Dye Reduction |
|---|---|---|---|---|---|
| 3 | 3.0 | 2.3 | dark blue | dark blue | 23 |
| 4 | 3.0 | 0.12 | dark purple | light purple | 96 |
| 5 | 2.9 | 0.0042 | dark blue | clear | 100 |
| 6 | 2.9 | 0.012 | dark blue | almost colorless | 99+ |
| 7 | 2.9 | 0.034 | dark blue | almost colorless | 99+ |
| 8 | 2.9 | 0.037 | dark blue | almost colorless | 99 |

TABLE 11

Selective Sorption of Acid Red 151 pH = 10, T = 50° C., 1000 ppm $H_2O_2$, and t = 60 minutes by Zr/MCM-41 materials

| Example No. | Initial dye Absorbance @λ = 508 nm | Final dye Absorbance @λ = 508 nm | Solution Color | Filtrate Color | % Dye Reduction |
|---|---|---|---|---|---|
| 5 | 1.3 | 0.0053 | pink | clear | 99 |
| 6 | 1.3 | 0.089 | pink | very light pink | 93 |
| 7 | 1.3 | 0.068 | pink | very light pink | 95 |
| 8 | 1.3 | 0.071 | pink | very light pink | 94 |

EXAMPLE 10

A Zr/MCM-41 material prepared as described in Example 5 was tested for Chicago Sky Blue removal in the absence of $H_2O_2$. 50 grams of a 20 ppm Chicago Sky Blue solution at pH=3–5 were mixed with 0.5 grams of Zr/MCM-41 from Example 5 and the solution heated at 50° C. with stirring for one hour. The solid was removed by filtration resulting in a water white clear solution and a blue solid. This example demonstrates that an antioxidant such as $H_2O_2$ is not necessary to remove the organic.

EXAMPLE 11

Synthesis of nickel-containing MCM-41

A nickel nitrate solution was prepared by dissolving 0.67 grams nickel nitrate hexahydrate in 10 grams deionized water. This solution was then added to 3 grams calcined MCM-41 and mixed well. The liquid was evaporated from the mixture at 60° C. for 18 hours. The nickel loading was 4.4 wt.%.

EXAMPLE 12

Synthesis of copper-containing MCM-41

A copper acetate hydrate solution was prepared by dissolving 0.46 grams copper acetate hydrate in 10 grams deionized water. This solution was then added to 3 grams calcined MCM-41 and mixed well. The liquid was evaporated from the mixture at 60° C. for 18 hours. The copper loading was 4.8 wt.%.

EXAMPLE 13

The sorption of large organic molecules by the sorbents prepared in Examples 11 and 12 was examined. 50 grams of a 20 ppm Chicago Sky Blue (C.I. 24410) solution at pH=3–5, were mixed with 0.5 grams catalyst. The sample was heated at 50° C. with stirring for one hour. The concentration of the Chicago Sky Blue was monitored by UV-Visible spectrometry.

The Ni/MCM-41 material reduced the Chicago Sky Blue absorbance at 614 nm from 2.6 to 0.030. The Cu/MCM-41 reduced the Chicago Sky Blue absorbance at 614 nm from 2.6 to 1.7.

EXAMPLE 14

MCM-41 with an $Si/Al_2$>400 and d-spacing of 40 Angstroms was prepared in accordance with U.S. Pat. 5,102,643. An amount of 0.5 grams of calcined MCM-41 was added to 50 grams of a 20 ppm Chicago Sky Blue solution, pH=3–5, at 50° C. for 60 minutes. No change in dye concentration, measured by UV-Visible spectrometry, was observed.

Changes and modifications in the specifically described embodiments can be carried out without departing from the scope of the invention which is intended to be limited only by the scope of the appended claims.

We claim:

1. A process for sorption separation of azo dyes from aqueous solution comprising contacting the aqueous solution with a sorbent, said sorbent comprising an inorganic, porous, non-layered crystalline phase material having zirconium incorporated therein, said material exhibiting after calcination, an X-ray diffraction pattern with at least one peak at a d-spacing greater than about 18 Å Units with a relative intensity of 100 and having a benzene adsorption capacity of greater than 15 grams per 100 grams of said material at 50 torr and 25° C.

2. The process according to claim 1, wherein said sorbent comprises MCM-41.

3. The process according to claim 1, wherein said sorbent comprises MCM-48.

4. The process according to claim 1, further comprising providing said sorbent in gel matrix for performing gel permeation chromatography.

5. The process according to claim 1, further comprising providing said sorbent in a system selected from the group consisting of flat-bed, batch, and column chromatography systems.

6. The process according to claim 1, wherein said zirconium is incorporated in the inorganic, porous, non-layered crystalline phase material by ion exchange or impregnation.

* * * * *